Jan. 24, 1956 M. C. ADDICKS Re. 24,112

MACHINE FOR CONVEYING BULK MATERIAL AND CONTROL THEREFOR

Original Filed May 12, 1952 7 Sheets-Sheet 1

INVENTOR.
Mentor C. Addicks
BY
Merchant & Merchant
ATTORNEYS

MACHINE FOR CONVEYING BULK MATERIAL AND CONTROL THEREFOR

Original Filed May 12, 1952 7 Sheets-Sheet 2

INVENTOR.
Merton C. Addicks
BY
Merchant & Merchant
ATTORNEYS

MACHINE FOR CONVEYING BULK MATERIAL AND CONTROL THEREFOR

Original Filed May 12, 1952 7 Sheets-Sheet 3

INVENTOR.
Mentor C. Addicks
BY
Merchant & Merchant
ATTORNEYS

MACHINE FOR CONVEYING BULK MATERIAL AND CONTROL THEREFOR

Original Filed May 12, 1952 7 Sheets-Sheet 4

INVENTOR.
Mentor C. Addicks
BY
Merchant & Merchant
ATTORNEYS

MACHINE FOR CONVEYING BULK MATERIAL AND CONTROL THEREFOR

Original Filed May 12, 1952 7 Sheets-Sheet 5

INVENTOR.
Mentor C. Addicks
BY
Merchant & Merchant
ATTORNEYS

MACHINE FOR CONVEYING BULK MATERIAL AND CONTROL THEREFOR
Original Filed May 12, 1952 7 Sheets-Sheet 6
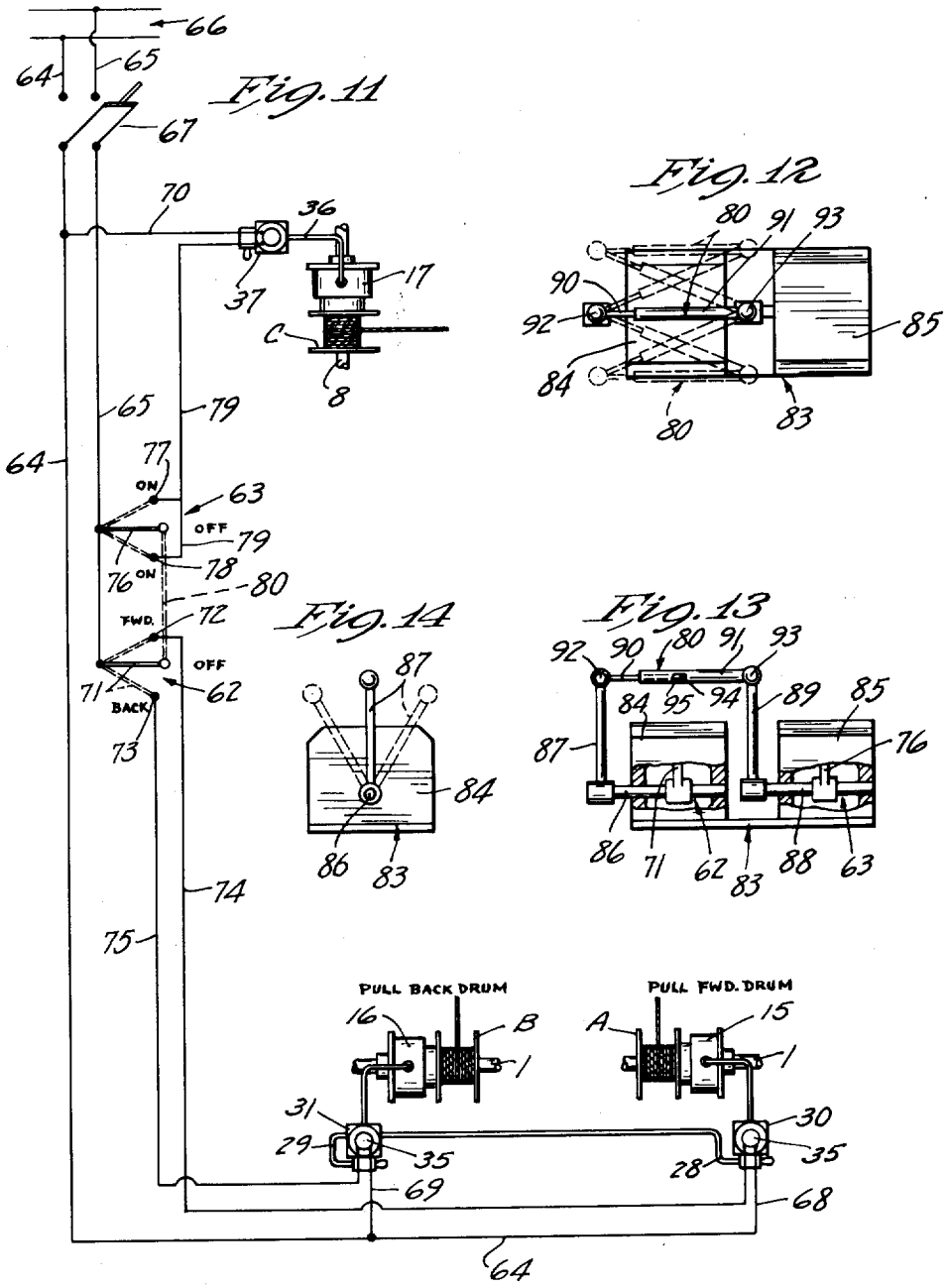
INVENTOR.
Mentor C. Addicks
BY
Merchant & Merchant
ATTORNEYS

MACHINE FOR CONVEYING BULK MATERIAL AND CONTROL THEREFOR

Original Filed May 12, 1952 7 Sheets-Sheet 7

INVENTOR.
Mentor C. Addicks
BY
Merchant & Merchant
ATTORNEYS

United States Patent Office

Re. 24,112
Reissued Jan. 24, 1956

24,112

MACHINE FOR CONVEYING BULK MATERIAL AND CONTROL THEREFOR

Mentor C. Addicks, Minneapolis, Minn.

Original No. 2,699,919, dated January 18, 1955, Serial No. 287,396, May 12, 1952. Application for reissue August 29, 1955, Serial No. 531,310

18 Claims. (Cl. 254—187)

Matter enclosed in heavy brackets [ ] appears in the original patent but forms no part of this reissue specification; matter printed in italics indicates the additions made by reissue.

My invention relates generally to machines for handling granular or bulk material and, more specifically, to improved mechanism for conveying bulk material from a given location to a point of delivery remote therefrom.

More particularly, my present invention is in the nature of a modification of the structure disclosed and claimed in my co-pending application Serial No. 209,175, filed February 2, 1951, now Patent No. 2,646,965 issued July 28, 1953, and entitled "Device for Handling Granular Material."

An important object of my invention is the provision of a cable winding drum for pulling a material-handling drag or scoop in one direction and of novel means for preventing backlash or overrunning of the drum when the cable is being unwound therefrom.

Another object of my invention is the provision of a cable winding drum and a drive shaft therefor having a releasable high torque transfer coupling and a low torque transfer coupling connecting the drive shaft to the drum, and of novel means for varying the torque transferability of the low torque transfer coupling.

Another object of my invention is the provision of conveying mechanism as set forth which is relatively simple and inexpensive to build and install, which is efficient in operation and which is rugged in construction and durable in use.

Still another object of my invention is the provision of a novel arrangement whereby a plurality of winding drums of the above type may be utilized in cooperation to move a material-handling scoop or drag over a relatively wide area and in various directions of travel without changing the locations of the winding drums.

A still further object of my invention is the provision of novel control means for conveying machines of the type set forth.

Another object of my invention is the provision of control means for conveying machines of the above type which may be easily carried by the operator, so as to enable the operator to be stationed at the most advantageous point for observation and control of the conveying operations.

The above and still further highly important objects and advantages of my invention will become apparent from the following detailed specification, appended claims and the accompanying drawings.

Referring to the drawings, which illustrate the invention, and in which like characters indicate like parts throughout the several views:

Fig. 3 is a view in side elevation of the machine of

Figure 1:
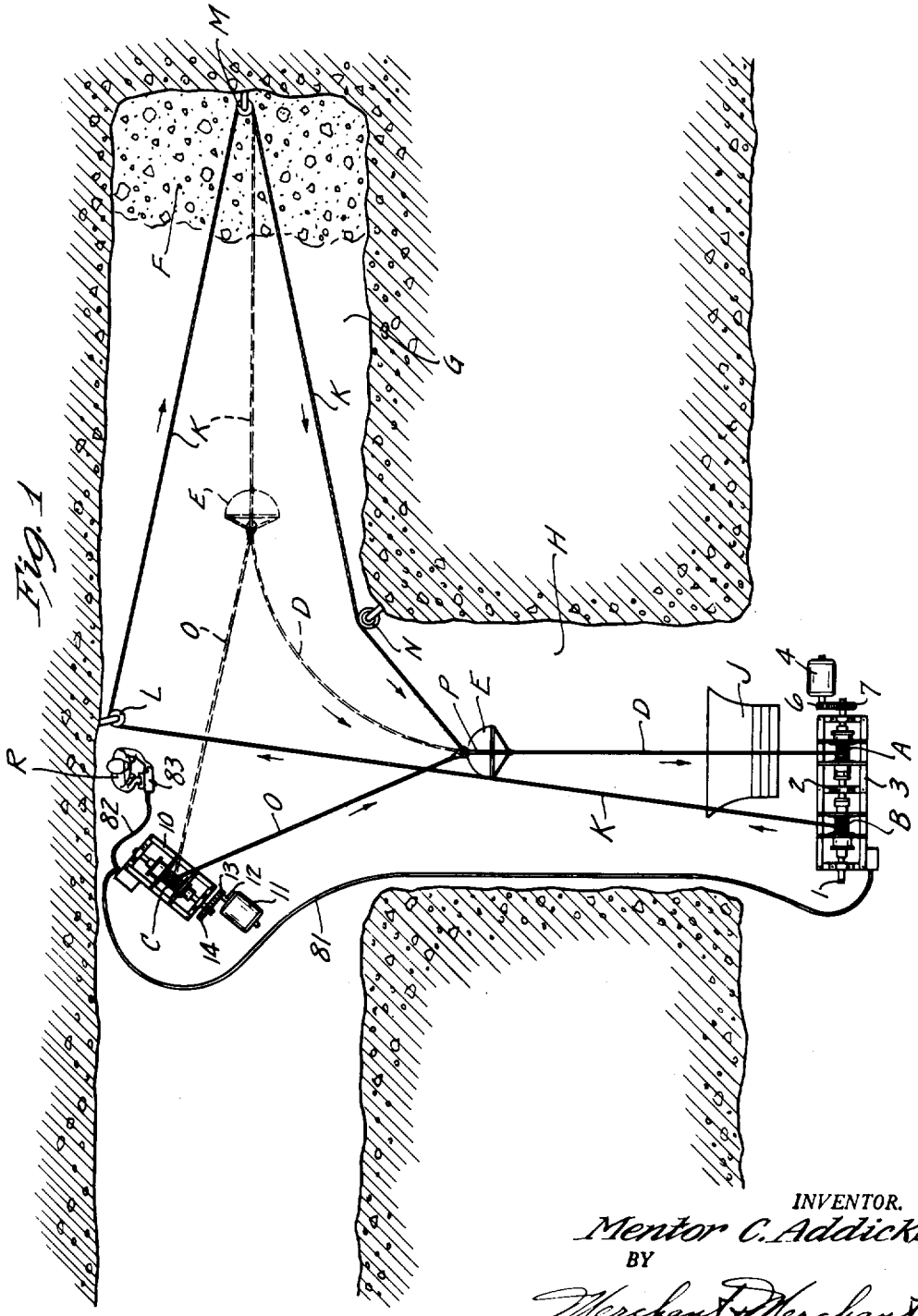
Fig. 1 is a diagrammatic view in horizontal section of a mine shaft or the like showing one of the operative arrangements of my novel conveying equipment.
Figure 2:
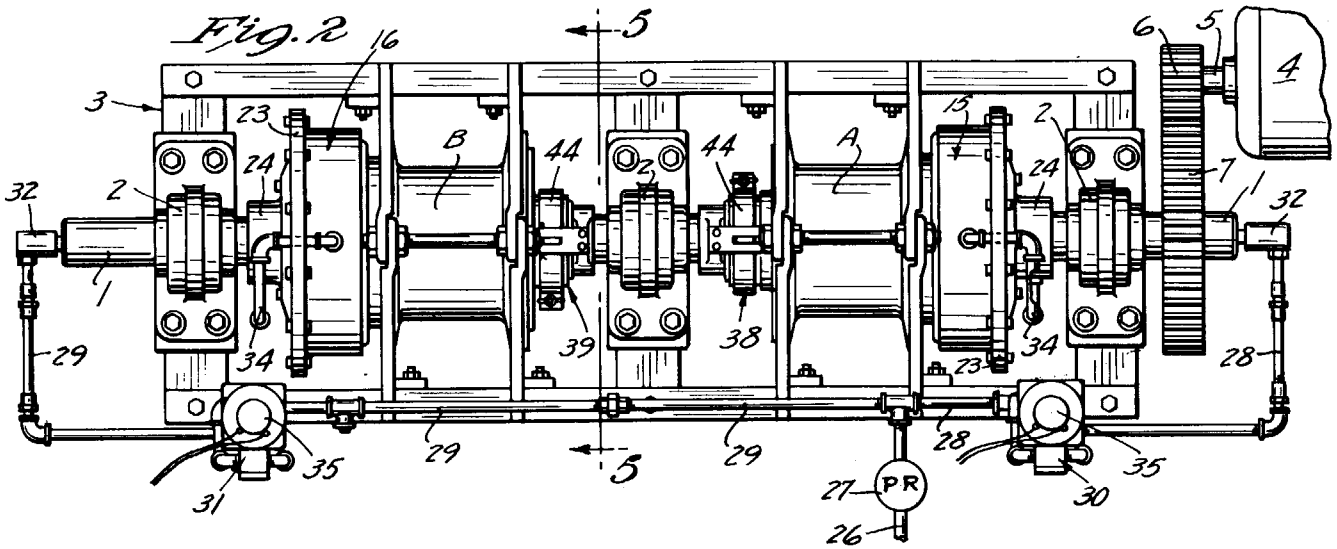
Fig. 2 is an enlarged view in plan of one of the conveying machines of my invention, some parts being broken away.
Figure 3:
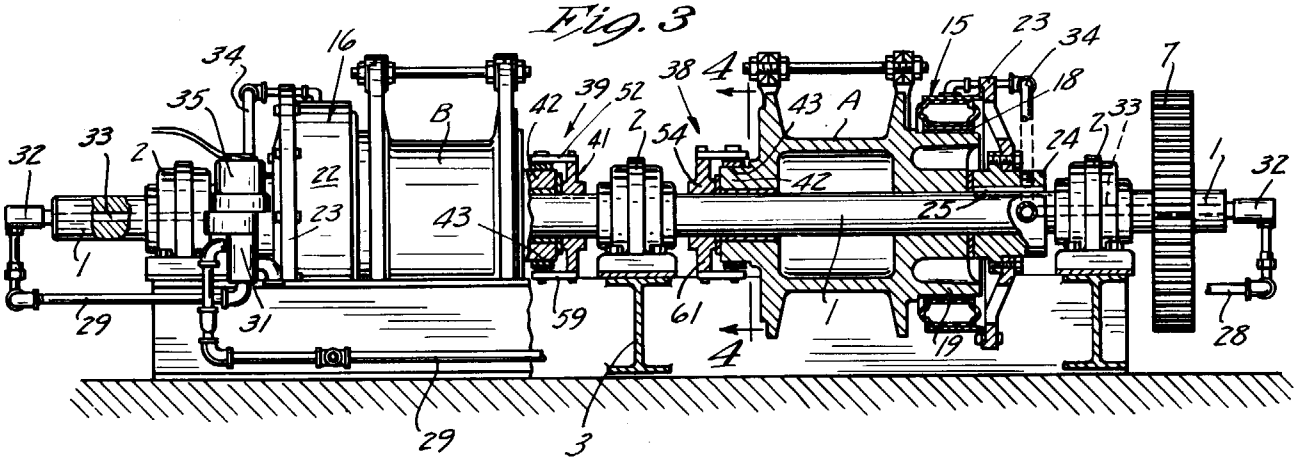
Figure 4:
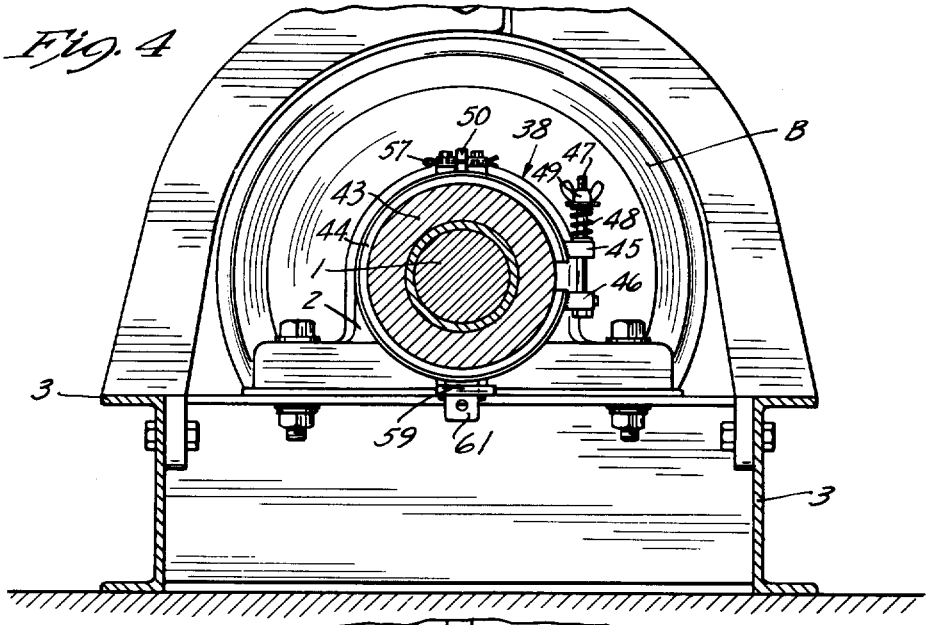
Figure 5:
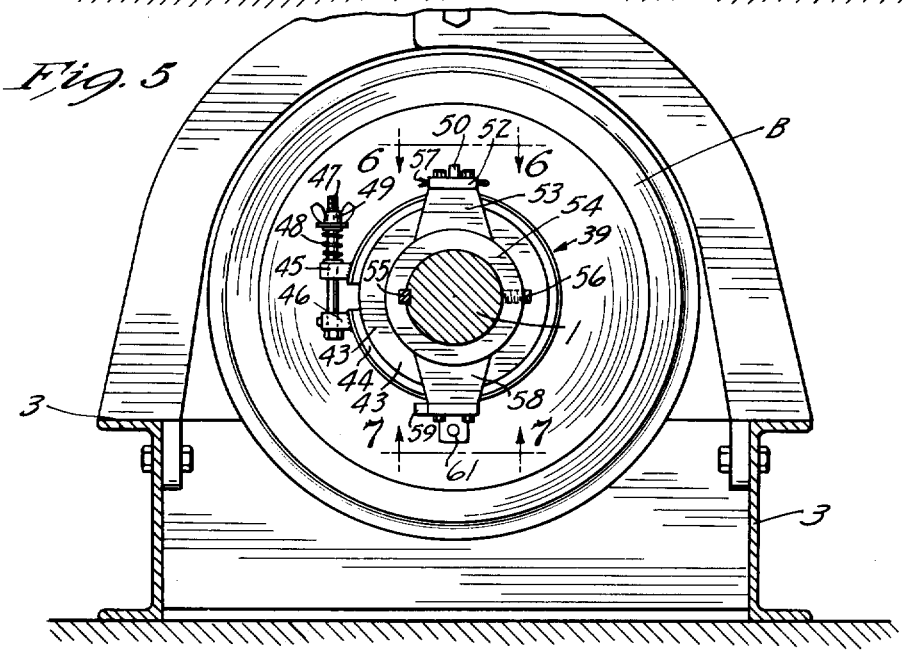
Figure 6:
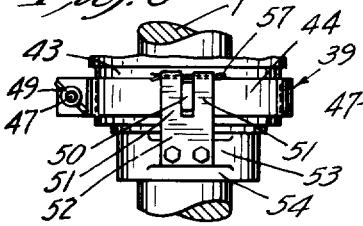
Figure 7:
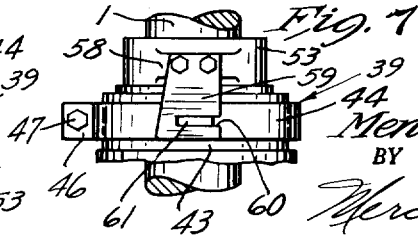
Figure 17:
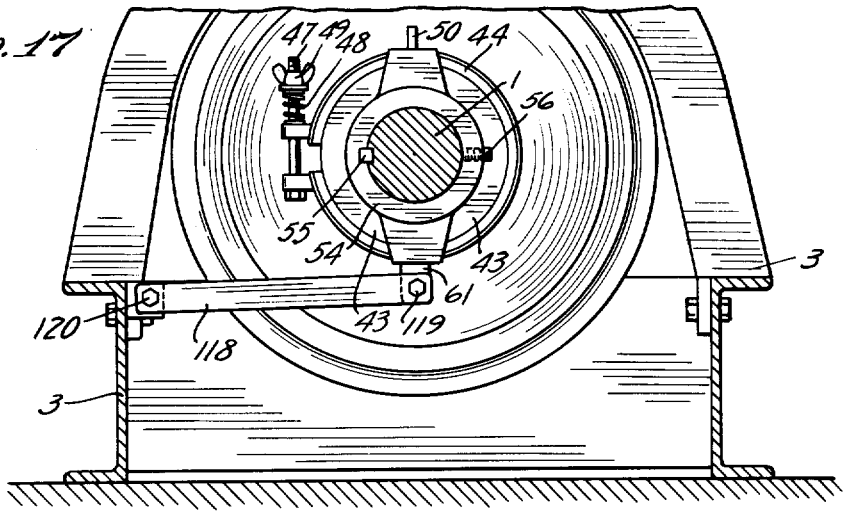
Figure 8:
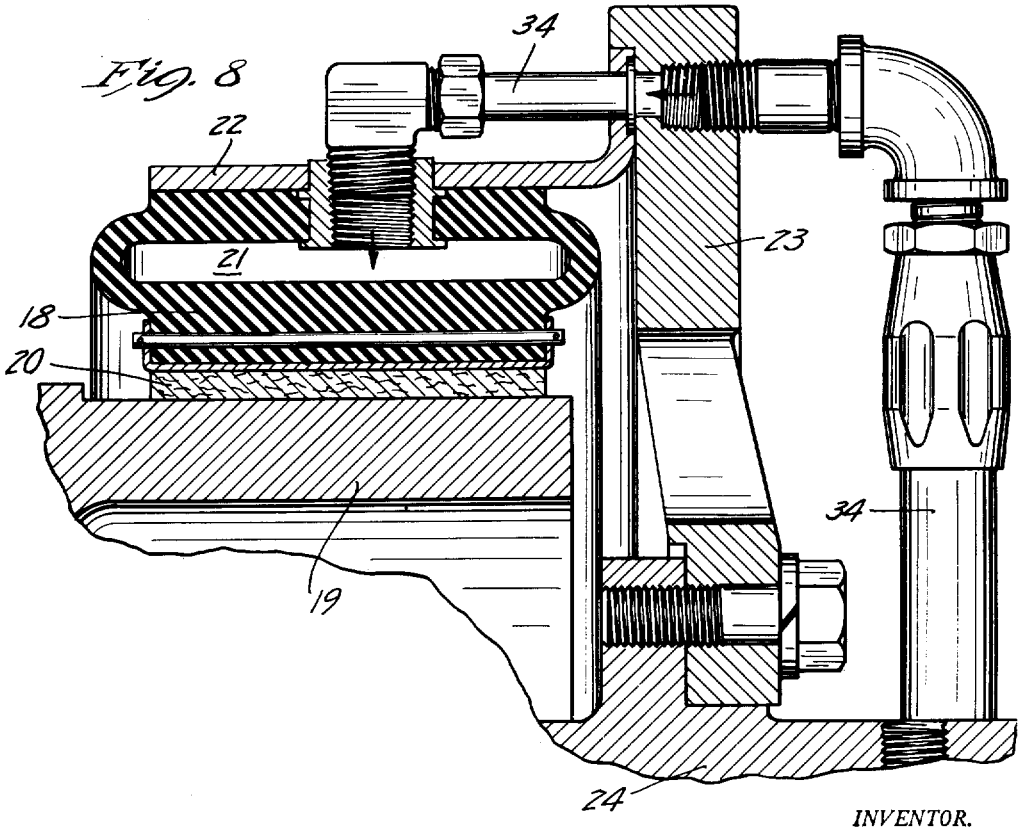
Figure 9:
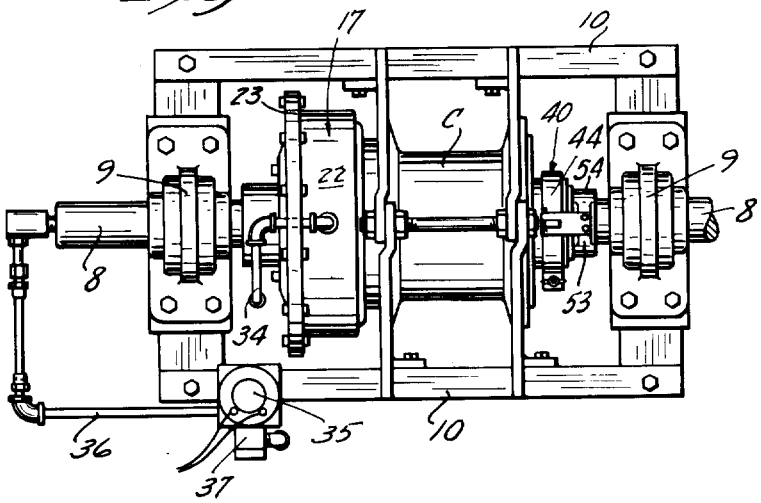
Figure 10:
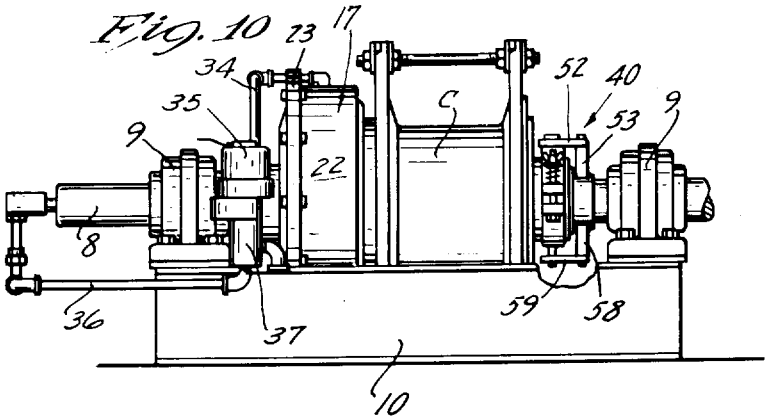
Figure 15:
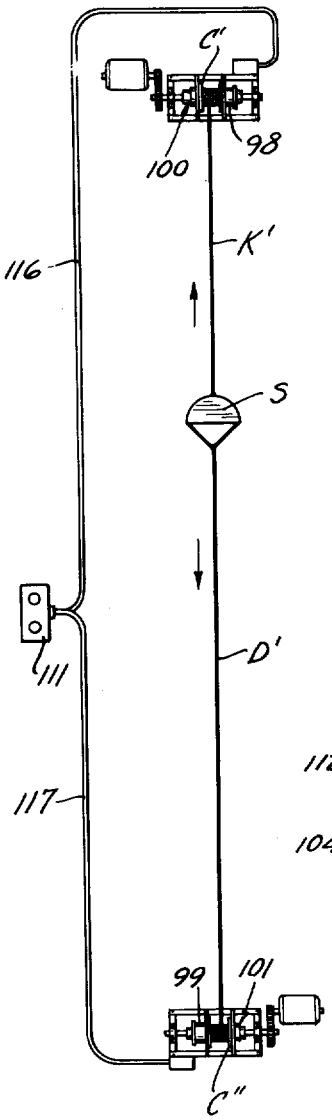
Figure 16:
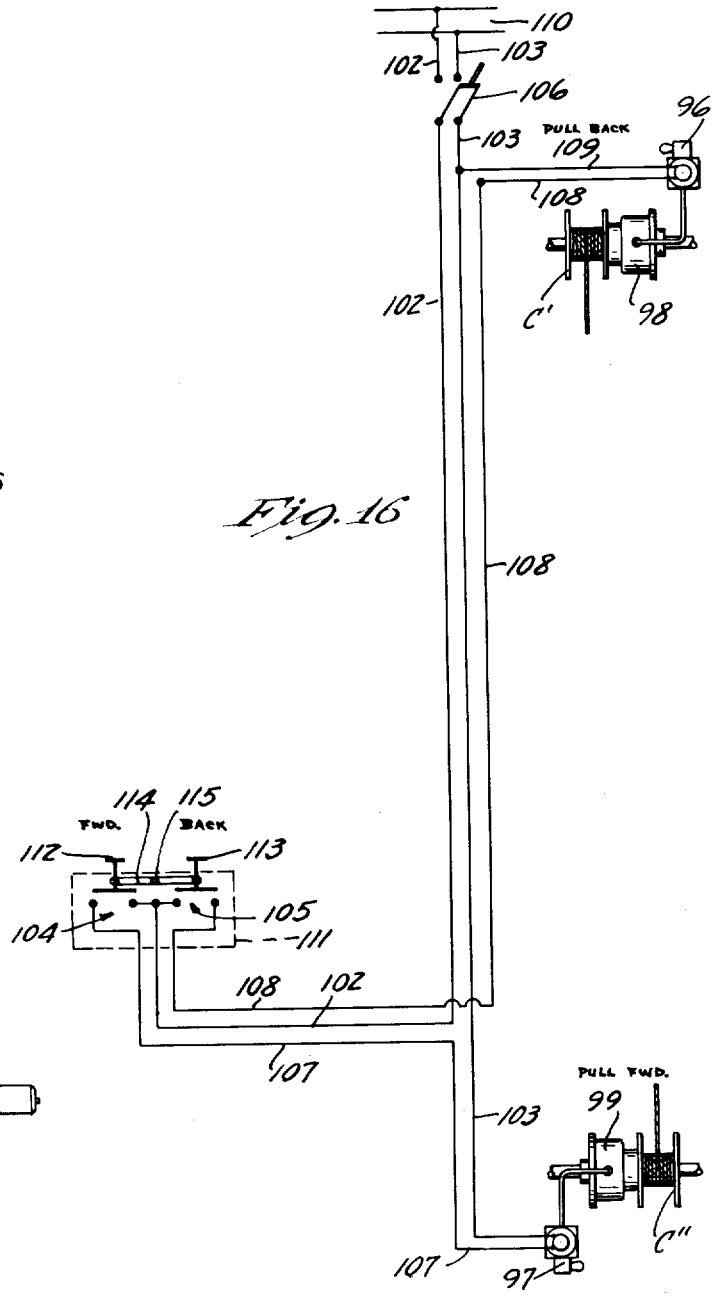

Fig. 2, some parts being broken away and some parts shown in section;

Fig. 4 is an enlarged transverse section taken on the line 4—4 of Fig. 3, some parts being broken away;

Fig. 5 is an enlarged transverse section taken substantially on the line 5—5 of Fig. 2, some parts being broken away;

Fig. 6 is a fragmentary detail as seen from the line 6—6 of Fig. 5;

Fig. 7 is a fragmentary detail as seen from the line 7—7 of Fig. 5;

Fig. 8 is a greatly enlarged fragmentary detail of a portion of Fig. 3;

Fig. 9 is a view in plan of a single drum machine of Fig. 1, some parts being broken away;

Fig. 10 is a view in side elevation of the structure of Fig. 9, some parts being broken away;

Fig. 11 is a diagram showing the control circuits utilized in the arrangement illustrated in Fig. 1;

Fig. 12 is a view in plan of the control switch of the invention of Figs. 1 to 11, inclusive;

Fig. 13 is a view in side elevation of the control of Fig. 12, some parts being broken away;

Fig. 14 is a view in end elevation of said control;

Fig. 15 is a diagrammatic illustration of a modified arrangement of my novel material-handling equipment;

Fig. 16 is a wiring diagram illustrating the electrical circuits utilized in the equipment of Fig. 15; and Fig. 17 is a view corresponding to Fig. 5, but showing a modified form of the invention.

In the conveying of granular or bulk material from one location to another, where the material must be delivered around obstructions such as corners and through branch corridors as are found in mines and the like, and when utilizing a drag or scoop, I have found it advisable to use a plurality, preferably three, of cable winding drums, as indicated at A, B and C. A length of cable D has one end portion wound on the drum A and is connected at its other end to the front portion of a drag shovel or scoop E. The cable D is utilized to pull the scoop E from the source of material designated at F at one end of a mine corridor or the like G, through a branch corridor H to a loading hopper or the like J. A pull-back cable K has one end portion wound on the drum B and is connected at its other end to the rear portion of the scoop E, said cable K running in and being guided by suitably placed tail sheaves and the like L and M secured by suitable means, not shown, to the walls of the mine or other structure. Where necessary, a guide roll N is utilized to prevent the pull-back cable K from rubbing against the corner between the two corridors G and H. A third length of cable O has one end portion wound on the drum C and has its other end slidably connected to a bar P extending from the front to the rear of the scoop E. As will hereinafter be explained, the cable O will, during one portion of the operation, be utilized as a pull-forward cable, whereas at another stage of the operation, the cable O will be utilized to move the scoop E in a backward or return direction.

The pull-forward drum A and the pull-back drum B are independently journaled on a drive shaft 1 which is journaled in suitable bearings 2 that are rigidly mounted on a generally rectangular supporting frame 3. Continuous and uninterrupted rotary movement is imparted to the drive shaft 1 by a motor 4, on the shaft 5 of which is mounted a drive pinion 6. The pinion 6 has meshing engagement with a gear 7 which is keyed or otherwise rigidly secured to one end of the drive shaft 1, see Figs. 1 to 3, inclusive.

The cable winding drum C, see Figs. 1, 9 and 10, is journaled on a drive shaft 8 which is, in turn, journaled in bearings 9 rigidly mounted on a supporting frame structure 10. The continuous and uninterrupted rotation is imparted to the drive shaft by a motor 11 to the shaft 12 of which is rigidly secured a pinion 13 which has meshing engagement with a gear 14 rigidly secured to one end of the drive shaft 8 for common rotation therewith.

The drums A, B and C are identical and are each driven by their cooperating drive shafts by means of separate releasable high torque transfer couplings, and each by a separate low torque transfer coupling. The high torque transfer couplings are identical as are the low torque transfer couplings associated with each drum; hence for the sake of brevity but one of each will be described in detail, the reference characters identifying the several parts of one of each thereof also being utilized to identify corresponding parts of the others thereof. The high torque transfer coupling of the drum A is designated in its entirety at 15, that of the winding drum B being designated in its entirety at 16, and that associated with the winding drum C being indicated in its entirety at 17. The high torque transfer coupling 15 comprises driving and driven clutch elements 18 and 19, respectively. The driving element 18 is in the nature of a fluid pressure operated expansible and retractable clutch member having a plurality of friction shoes or the like 20 secured thereto for gripping engagement with the drum 19. The member 18 is made in the form of an annular tube from rubber-like material and defines an expansion chamber 21. The outer peripheral portion of the member 18 is suitably anchored to an annular flange 22 which, in turn, is rigidly secured to and carried by a mounting plate 23 having a hub 24 which is keyed or otherwise anchored to the drive shaft 1, as indicated at 25, see Fig. 3. The releasable high torque transfer couplings 15 to 17, inclusive, are of the type disclosed in the United States Letters Patent to Thomas Fawick, No. 2,237,864.

Fluid such as air under pressure is admitted to the chambers 21 of the couplings 15 and 16, from a suitable source, not shown, through a conduit 26 in which is interposed a conventional pressure regulator valve 27, and branch conduits 28 and 29, respectively, in which are interposed solenoid operated valves 30 and 31, respectively. The conduits 28 and 29 terminate in elbow-like fittings 32 at opposite ends of the shaft 1 and which communicate with axially extended passages 33 therein, see Fig. 3. The passages 33 communicate with axial passages, not shown, but which may be assumed to extend through the hubs 24, to each of which is connected an extension conduit 34 which communicates with the chamber 21 of its respective clutch or driving element 18. The solenoids for operating the valves 30 and 31 are conventional in nature and may be assumed to be contained in casings 35. Energization of the solenoids contained in the casings 35 permits air under predetermined pressure to enter the chambers 21, whereby to cause engagement of the clutch members 18 with the respective clutch or driven elements 19. When said solenoids are de-energized, their respective valves 30 and 31 are positioned as to cause communication of the respective chambers 21 with atmosphere. The structure of the clutch elements 18 is such that the friction shoes 20 thereof are normally out of engagement with the drum 19, so that when the chambers 21 are open to atmosphere, the driving connection between the driving and driven elements 18 and 19, respectively, is released.

With reference to Figs. 9 to 11, inclusive, it will be seen that the high torque transfer coupling 16 is supplied with air under pressure from the source of supply through a conduit in which is interposed a solenoid operated valve 37 identical to the valves 30 and 31.

As above indicated, the drums A, B and C are each provided with a low torque transfer coupling 38, 39 and 40, respectively. The low torque transfer couplings are identical and each comprises driving and driven elements

41 and 42, respectively, the latter being in the nature of a cylindrical friction surface formed on a hub 43 of its respective winding drum. The driving element 41 comprises a circumferentially extending friction shoe or band 44 having opposed outturned flanges 45 and 46 at its opposite ends. A wing nut-equipped adjustment screw 47 extends through aligned apertures in the flanges 45 and 46 and a coiled compression spring 48 encompasses the bolt 47 between the flange 45 and said wing nut which is indicated at 49. The spring 48 exerts a yielding bias against the flange 45 and the wing nut 47 in a direction to cause the band 44 to frictionally engage the surface of its cooperating hub 43. This frictional engagement or pressure may be varied by tightening or loosening of the wing nut 49 on the bolt 47. The band 44 is provided with a radially outwardly projecting lug 50 which is confined between laterally projected legs 51 of a plate 52 that is bolted or otherwise rigidly secured to an arm 53 integrally formed with and projecting radially outwardly from a hub 54 that is rigidly secured to the drive shaft 1 by means of a key 55 and a set screw 56. As shown in Figs. 4 to 6, inclusive, a cotter pin or the like 57 extending through aligned apertures in the outer ends of the legs 51 confines the lug 50 between the legs 51 in a direction axially of the drive shaft 1. Integrally formed with the hub 54 and projecting radially outwardly therefrom in diametrically opposed relationship to the arm 53 is a second arm 58. A guide plate 59 is rigidly secured to the outer end of the arm 58 and extends outwardly therefrom in a direction axially of the drive shaft 1, the outer end thereof overlying a portion of the band 44. The outer end portion of the plate 59 is provided with a recess or notch 60 in which is received a lug 61 which projects radially outwardly from the band 44. The plate 59 confines the band 44 against axial movement on the hub 43 and prevents relative rotary movement between the shaft 1 and the band 44 in one direction.

When rotation is impartted to the shaft 1 by the motor 4, the high and low torque transfer coupling driving elements 15 and 41, respectively, being rigid therewith, rotate in the same direction. The air chambers 21 of the high torque transfer couplings 15 and 16 being in communication with atmosphere to the valves 30 and 31, respectively, there is no driving engagement between the driving elements 15 and driven elements 19 of the high torque transfer couplings. However, when the high torque transfer couplings 15 and 16 are thus released, the drums A and B tend to rotate in the same direction as that of the drive shaft 1 due to the frictional loading between the driving and driven elements 41 and 42, respectively, of the low torque elements 38 and 39. With reference to Fig. 1 it will be seen that the length of cable D is partially wound on the drum A in one direction while a portion of the pull-back or return cable K is wound upon the drum B in the opposite direction. Hence, when the high torque transfer coupling 15 of the drum A is set, a high torque driving load is placed upon the drum A, causing the pull-forward cable D to be wound thereon. Obviously, at this time, there is no differential in speed between the driving and driven elements of the low torque transfer coupling 38 associated with the drum A. The pull-back cable K being connected to the rear of the scoop E to which the pull-forward cable D is also connected, winding up of the cable D upon the drum A will cause the pull-back or return cable K to be unwound from the drum B, thereby causing the drum B to be rotated in a direction opposite to the direction of rotation of the drive shaft 1. Thus, the driving and driven elements 41 and 42 of the low torque transfer coupling 29 are rotating in opposed directions. When the high torque transfer coupling 15 is released, rotation of the drum A will cease almost instantaneously due to the load placed thereon by the drag or scoop E. The frictional load of the low torque coupling 39 is sufficient to overcome the inertia of the winding drum B which, as above stated, has been rotating in the opposite direction, so as to effectively prevent overrunning of the drum B and consequent undue slack in the return cable K, which might otherwise result in backlash. *It is highly important that the tension or force of the low torque transmission be made adjustable. The location of machine installations with relation to the material being conveyed will necessitate considerable variations in the lengths of cable used, and therefore the required torque to keep the return or pull-back cable under tension will vary. Also changes of temperature between winter and summer affects the expansion and contraction of cable, and wear of clutch parts and various bearings may also necessitate change in adjustment of the tension of the low torque transmission.* By manipulation of the adjusting nut 49 on the low torque transfer coupling, the low torque transferability of said couplings may be adjusted to maintain the slack in the unwinding cable at a minimum without imposing an undue load on the drum A and the cable D being wound thereon. When the scoop E is being returned to its point of loading, by setting the high torque transfer coupling 16 and causing the return cable K to be wound on the drum B, the low torque transfer coupling 38 associated with the drum A will operate to prevent overrunning in the drum A and backlash in the cable unwinding therefrom upon realease of the high torque transfer coupling 16 associated with the drum B and cessation of rotation of the drum B.

For controlling the operation of the drums A and B as well as the drum C in an arrangement such as illustrated in Fig. 1, a pair of control switches 62 and 63 are utilized in an electrical circuit including the solenoid associated with the valves 30, 31 and 37. As shown, a pair of leads 64 and 65 are connected to opposite sides of a power line 66. A main switch 67 is interposed in the leads 64 and 65, the leads 64 being connected to the solenoids of the valves 30, 31 and 37 by branch leads 68, 69 and 70, respectively. The switch 62 comprises a pivotally mounted element 71 which is movable between spaced switch contacts 72 and 73, the former of which is connected to the solenoid of the valve 30 by a lead 74 and the latter of which is connected to the solenoid of the valve 31 by a lead 75. The switch 63 comprises a pivotally mounted switch element 76 movable between spaced contact elements 77 and 78 that are connected by a common lead 79 to the solenoid associated with the valve 37 of the winding drum C. As shown, the switch elements 71 and 76 both may be maintained in an "off" position between their respective contacts. As diagrammatically shown in Fig. 11, the switch elements 71 and 76 are connected for common movements by means including a bar 80 which will hereinafter be more fully described.

Preferably and as shown in Figs. 1 and 11, the wires from the solenoids of the switches 30, 31 and 37 and leading to the switches 62 and 63 are confined in long cables 81 and 82, the latter of which terminates in a portable controller 83 which may be easily carried about by the operator, indicated at R. The controller 83 includes a pair of switch housings 84 and 85 which contain the switches 62 and 63, respectively, see Figs. 12–14, inclusive. As shown, the movable switch element 71 is connected to a shaft 86 journalled in the housing 84 and to the outer end of which is rigidly secured the lower end of a crank arm 87. Similarly, the movable element 76 of the switch 63 is secured at its lower end to a shaft 88 which is journaled in the housing 85 and has secured to its outer end the lower end of a crank arm 89. The actuator bar 80 is made up of a pair of telescoping sections 90 and 91, the former of which is connected at its outer end to the upper end of the crank arm 87 by a ball and socket connection 92, and the latter of which has its outer end connected to the upper end of the crank arm 89 by a similar ball and socket connection 93. As shown particularly in Fig. 13, the bar section 90 is longitudinally movable with respect to its cooperating section 91 and is provided with a transverse pin 94 which moves within a longitudinally elongated slot 95 in the section 91. The extent of the slot 95 limits the amount of relative longitudinal movement between the bar sections 90 and 91, for a purpose which will hereinafter become apparent. As above noted, the operator R, in controlling the operation of the several drums A, B and C in an arrangement as illustrated in Fig. 1, may station himself at any convenient or advantageous location. When the scoop E is in its full line position of Fig. 1 and moving toward the discharge hopper J, the cable D is being wound upon the drum A while the cables K and O are being unwound from their respective drums B and C. Otherwise stated, the high torque transfer coupling 15 is set whereas the high torque couplings 16 and 17 are released. Also, during this time, the switch arm 76 of the switch 63 is at its "off" position, whereas the switch arm 71 of the switch 62 is positioned to close the circuit to the solenoid operated valve 30 through the contact 72, the leads 64, 65 and 74 and the branch leads 68. During the forward travel of the scoop E, the cables K and O are under tension caused by the drag imposed upon their respective drums B and C by the low torque transfer couplings associated therewith. As soon as the scoop E reaches the hopper J and discharges material thereinto, the operator manipulates the actuator bar 80 to connect the switch arm 76 with one of the contacts 77 or 78 and to move the switch arm 71 to its "off" position. The high torque transfer coupling 17 of the drum C is thereby set and the scoop E is pulled backwardly through the corridor H by the cable O, the resultant slack in the cable K being immediately taken up by winding rotation of the drum B, said winding rotation being imparted thereto by the low torque transfer coupling 39 associated therewith. Simultaneously, the cable D is being unwound from the drum A. When the scoop E has been pulled by the cable O into the gallery G, the operator manipulates the actuator bar 80 to place the switch 63 in its "off" position and closes the connection between the switch arm 71 of the switch 62 and the contact 73 thereof, whereby to release the high torque transfer coupling 17 of the drum C and to set the high torque transfer coupling 16 of the drum B. The pull-back or return cable K is then wound upon the drum B, thus pulling the scoop E backwardly toward the tail sheave M to a point where another load of loose material may be gathered. When the scoop E has reached a predetermined point of its movement toward the tail sheave M, the operator R then manipulates the actuator bar 80 to move the switch arm 71 to its "off" position and the switch arm 76 to one of its "on" positions in connection with either switch contact 77 or 78, whereby to release the high torque transfer coupling 16 and set the coupling 17. It should be borne in mind that the end of the cable O is slidable on the rod P of the scoop E so that the cable O may be used to pull the scoop in a forward or backward direction with equal facility and without tending to turn the scoop E end for end. The cable O pulls the scoop E forwardly along the gallery G until the scoop reaches the intersection between the gallery G and corridor H, the cable D meanwhile being wound upon the drum A under rotation of the drum A imparted thereto by the low torque transfer coupling 38 associated therewith. When the scoop E reaches said intersection, the operator then manipulates the actuator bar 80 to move the switch arm 76 to its "off" position and the switch arm 71 into connection with the contact 72 to set the high torque transfer coupling 15 of the drum A to move the scoop forwardly through the corridor H to the hopper I, thus completing a single cycle of operation. It should be noted that the roller N prevents the return cable K from rubbing against the rough wall during the forward movement of the scoop E through the corridor H, and likewise prevents the pull-forward cable D from rubbing against the corner during the movement of the scoop E through the gallery G toward the tail sheave M.

It should further be noted that the switching arrangement is such that the high torque transfer couplings 15 and 16 cannot be set simultaneously. This is a precautionary measure designed to prevent breaking of the cables K or D if the same were to be placed under pulling load of their respective high torque transfer couplings at the same time. The high torque transfer couplings of the drums A and C may be set for simultaneous operation as may the transfer couplings of the drums B and C for controlling and guiding the scoop E along selected paths. The operator is, in these instances, under the necessity of being alert to prevent pulling of any of these cables in opposition to another cable which is under pulling tension of their respective high torque couplings. The pressure relief or regulator valve 27 may be assumed to be set to allow all of the high torque transfer couplings to carry a predetermined maximum load. This maximum load will necessarily be less than that necessary to cause damage to any of the parts in the event that the operator fails to control the machine properly. The actuator bar 80 enables the operator to have perfect control over the high torque transfer couplings with one hand and movement of the bar 80 to any of its dotted line positions of Fig. 12 will cause the machine to function as desired. As shown in Figs. 11, 12 and 14, movement of the actuator bar 80 to its full line position of these figures releases all of the several high torque transfer couplings and effectively stops all movement of the scoop E. The function of the several low torque transfer couplings in causing otherwise slack cables to be wound on the drums associated therewith, permits sudden reversal of the direction of travel of the scoop E at any point in its travel smoothly and without jerking, thus the scoop can be made to travel at relatively high speeds so as to convey a maximum amount of material with a minimum time consumption.

In the arrangement illustrated in Figs. 15 and 16, the scoop S is shown as being connected to adjacent ends of a pair of cables D′ and [A′.] *K′*. In this arrangement, I utilize a pair of drums C′ and C″, identical in all respects to the drum C and having driving connections and mounting means identical to that of the drum C. This arrangement is particularly adapted for moving granular material in the holds of ships, long storage bins of certain elevators, and the like. For controlling the drums C′ and C″, I provide respective solenoid operated valves 96 and 97 which are interposed in a fluid pressure line similar to that described in connection with Figs. 2 and 3. The valves 96 and 97 admit air under pressure to high torque transfer couplings 98 and 99 associated with their respective drums C′ and C″. The low torque transfer couplings associated with the drums C′ and C″ are not shown in detail but are indicated in Fig. 15 at 100 and 101, respectively.

A control circuit for the valves 96 and 97 comprises a pair of leads 102 and 103, a pair of switches 104 and 105, a master control switch 106 and branch leads 107, 108 and 109. As shown, the leads 102 and 103 are adapted to be connected one each to the opposite sides of a two-wire power line 110. The lead 102 is common to both switches 104 and 105 whereby closing of the switch 104 will cause the valve 97 to set the high torque transfer coupling 99 by being energized through the lead 102, switch 104, the lead 107, the solenoid associated with the valve 97 and the lead 103. On the other hand, the valve 96 is operated to set the high torque transfer coupling 98 associated with the drum C′ by closing of the switch 105, whereby to cause the circuit to be closed through the lead 102, the switch 105, lead 108, the solenoid associated with the valve 96, lead 109 and a portion of lead 103.

The switches 104 and 105 are of the push button type mounted in a common control box 11 which may be carried by the operator in the manner of the controller 83 and which is provided with a push button 112 associated with the switch 104 and a like push button 113 which is associated with the switch 105. The push buttons 112 and 113 are connected to the opposite ends of a lever

114, which as diagrammatically shown, is pivotally secured at its center in the control box 111, as indicated at 115. With this arrangement, closing of either of the switches 104 and 105 will positively open the other thereof, thereby precluding any possibility of both of the high torque transfer couplings 98 and 99 being set at the same time. The several leads of the control circuit are contained within suitable cables 116 and 117 leading from the machines to the control box 111 so that the operator is free to position himself to the best advantage in the operation of this arrangement of my conveyor machines. Obviously, other arrangements such as that shown in my co-pending application above identified will suggest themselves to a person skilled in the art.

In the modified arrangement shown in Fig. 17, the low torque transfer coupling 41 is altered by the removal of the plates 52 and 59 from their respective arms 53 and 58. As shown, a rigid link 118 is connected at one end to the depending lug 61 by means of a nut-equipped bolt 119 and at its other end is anchored to the supporting frame 3 by a nut-equipped bolt 120. Otherwise, the parts illustrated in Fig. 17 are identical to corresponding parts of Figs. 1 to 10, inclusive, and bear like reference characters. With this arrangement, a frictional load of relatively low torque is placed upon the winding drum in both directions of its rotation. This arrangement prevents backlash during unwinding of the cable from the drum, but is not intended to pick up slack which might occur in the cable. For this reason, the bar 118 may very conveniently be substituted for the plates 52 and 59 when the machine is used as illustrated in Fig. 15.

While I have shown and described a preferred arrangement and several modifications of my improved shovelling or conveying machine, it will be understood that the same is capable of further modification within the spirit and scope of the invention as defined in the claims.

What I claim is:

1. In a device of the class described, a supporting structure; a winding drum journaled for rotation on the supporting structure; a drive shaft; power transmission mechanism connecting the drive shaft to the winding drum, said power transmission mechanism including a low torque transfer friction coupling comprising relatively rotary driving and driven elements, the former of which is connected to the drive shaft and the latter of which is connected to the drum, and a releasable high torque transfer coupling connecting the drive shaft to the drum; and means for varying the torque transferability of said low torque transfer coupling, said means comprising an adjustment member operative to increase or decrease the frictional load applied by one of said elements to the other thereof.

2. In a device of the class described, a supporting structure; a winding drum journaled for rotation on the supporting structure, a drive shaft, power transmission mechanism connecting said drive shaft to said winding drum, said power transmission mechanism including a low torque friction transfer coupling comprising relatively rotary driving and driven elements, the former of which is connected to the drive shaft and the latter of which is connected to the drum and a releasable high torque transfer coupling connecting the drive shaft to the drum, the torque transferability of the releasable high torque transfer coupling being sufficient to overcome the resistance of a work load of predetermined value, and the low torque transfer coupling delivering a maximum torque insufficient to drive said load while producing a sufficient drag between the shaft and drum to drive the drum in the absence of said load and to prevent overrunning of the drum when paying out cable in a direction of rotation opposite that of the shaft, and means for varying the torque transferability of said low torque transfer coupling below the maximum delivery thereof, said means comprising an adjustment member on one of said elements operative to increase or decrease the frictional load applied by one of said elements to the other thereof.

3. In a device of the class described, a supporting structure, a winding drum journaled for rotation on the supporting structure, a continuously operating constant speed drive shaft, and power transmission mechanism connecting said drive shaft to said winding drum, said power transmission mechanism including a low torque friction transfer coupling comprising relatively rotary driving and driven elements, the former of which is connected to the drive shaft and the latter of which is connected to the drum, and a releasable high torque transfer coupling connecting the drive shaft to the drum, and means for varying the torque transferability of said low torque transfer coupling, said means comprising an adjustment member on one of said elements and operative to increase or decrease the frictional load applied thereby to the other of said elements.

4. In a device of the class described, a supporting structure, a drive shaft journaled in said supporting structure, a winding drum journaled on said drive shaft, power transmission mechanism connecting said drive shaft to said winding drum, said power transmission mechanism including a low torque friction transfer coupling comprising relatively rotary driving and driven elements, the former of which is connected to the drive shaft and the latter of which is connected to the drum, a releasable high torque transfer coupling connecting the drive shaft to the drum, and means for varying the torque transferability of said low torque transfer coupling, said means comprising an adjustment member on one of said elements operative to increase or decrease the frictional load applied thereby to the other of said elements.

5. In a device of the class described, a supporting structure, a winding drum journaled for rotation on the supporting structure, a drive shaft, power transmission mechanism connecting the drive shaft to the winding drum, said power transmission mechanism including a low torque transfer friction coupling comprising relatively rotary driving and driven elements, the former of which is connected to the drive shaft and the latter of which is connected to the drum, one of said elements having a working face and the other of said elements including a friction shoe movable toward and away from operative engagement with said working face, adjustable means urging said shoe toward engagement with said working face, and a releasable high torque transfer coupling connecting the drive shaft to the drum.

6. In a device of the class described, a supporting structure, a drive shaft journaled in said supporting structure, a winding drum journaled on said drive shaft, power transmission mechanism connecting said drive shaft to said winding drum, said power transmission mechanism including a low torque friction transfer coupling comprising relatively rotary driving and driven elements, the former of which is connected to the drive shaft and the latter of which is connected to the drum, said driven element having a cylindrical working face, said driving element including a circumferentially extended friction shoe radially contractable and expansible toward and away from operative engagement with said working face, adjustable means urging said shoe toward operative engagement with said working face, and a releasable high torque transfer coupling connecting the drive shaft to the drum independently of said low torque transfer coupling.

7. In a device of the class described, a supporting structure, a drive shaft journaled in said supporting structure, a winding drum journaled on said drive shaft, power transmission mechanism connecting said drive shaft to said winding drum, said power transmission mechanism including a hub on said winding drum having a cylindrical working face, a band-like friction shoe enengaging said working face, means coupling said friction shoe to said drive shaft for common rotation therewith, yielding means biasing said friction shoe toward frictional engagement with said working face, means for varying the bias of said yielding means, said shoe and working face providing a low torque transfer coupling, and a releasable high torque transfer coupling connecting the drive shaft to the drum independently of said low torque transfer coupling.

*8. A system for conveying bulk material, comprising a pair of cable winding drums each journaled for independent rotation, a bulk load moving member, a cable operatively connected to said member and with the free ends thereof connected to each of said drums for winding thereon and moving said member in opposite directions between said drums, rotary driving means, coupling means connecting each of said drums with the driving means including releasable high torque means and low torque means, and an independent actuator operably connected to each of said high torque means for setting and releasing the same with respect to the driving means, each of said low torque means being effective to maintain tension on its respective drum and cable portion when the cooperating high torque means is ineffective and the high torque means of the other drum is effectively connecting the respective drum to the driving means.*

*9. A system for conveying bulk material, comprising a pair of cable winding drums each journaled for independent rotation, a bulk load moving member, a cable operably connected with said member and with the free ends of said cable connected to each of said drums for winding thereon and moving said member in opposite directions, rotary driving means, coupling means connecting each of said drums with the driving means including a releasable high torque means and a low torque means, an independent actuator operably connected to each of said high torque means for setting and releasing the same with respect to the driving means, and control means operatively connected to each of said actuators and adapted to alternately render one of said actuators effective to set its respective high torque means and simultaneously render the other actuator ineffective to release its respective high torque means, each of said low torque means being effective to maintain tension on its respective drum and cable portion when the cooperating high torque means is ineffective and the high torque means of the other drum is effectively connecting the respective drum to the driving means.*

*10. A system for conveying bulk material, comprising a pair of cable winding drums each journaled for independent rotation, a bulk load moving member, a cable operably connected to said member and with the free ends thereof connected to each of said winding drums for winding thereon and moving said member relative to said drums, rotary driving means, coupling means connecting each of said drums with the driving means including releasable high torque means and low torque means, an independent actuator operably connected to each of the high torque means for setting and releasing the same relative to the rotary driving means, and control means operably connected to both of said actuators and adapted to alternately render one of said actuators effective to set its respective high torque means and simultaneously render the other actuator ineffective to release its respective high torque means, each of said low torque means being effective to maintain tension on its respective drum and cable portion when the cooperating high torque means is ineffective and the high torque means of the other drum is effectively connecting the respective drum to the driving means.*

*11. A system for conveying bulk material, comprising a pair of cable winding drums each journaled for independent rotation, a bulk load moving member, a cable operably connected to said member and with the free ends thereof connected to each of said winding drums for winding thereon and moving said member relative to said drums, rotary driving means, coupling means connecting each of said drums with the driving means including*

*releasable high torque means and low torque means, an independent actuator operably connected to each of the high torque means for setting and releasing the same relative to the rotary driving means, and control means for operating said actuators to set and release the high torque means comprising a circuit including said actuators, independent switches in said circuit operably connected to each of said actuators, and mechanical means connecting both of said switches and when one of the switches is closed is effective to maintain the other switch simultaneously open and assure that only one high torque coupling means is effective at any one time, each of said low torque means being effective to maintain tension on its respective drum and cable portion when the cooperating high torque means is ineffective and the high torque means of the other drum is effectively connecting the respective drum to the driving means.*

*12. A system for conveying bulk material, comprising three cable winding drums each journaled for independent rotation, a bulk load moving member, cable means connected to said bulk moving member and to each of the respective drums for winding thereon and moving said member in a direction relative to said drums, a rotary driving means for each of said drums, coupling means connecting each of said drums with the driving means including releasable high torque means and low torque means, and an independent actuator operably connected to each of said high torque means for setting and releasing the same with respect to the driving means, each of said low torque means being effective to maintain tension on its respective drum and cable portion when the cooperating high torque means is ineffective and the high torque means of one of the other drums is effectively connecting the respective drum to the driving means.*

*13. A system for conveying bulk material, comprising three cable winding drums each journaled for independent rotation, a bulk load moving member, cable means connected to said bulk moving member and to each of the respective drums for winding thereon and moving said member in a direction relative to said drums, a rotary driving means for each of said drums, coupling means connecting each of said drums with the driving means including releasable high torque means and low torque means, an independent actuator operably connected to each of the high torque means for setting and releasing the same relative to the rotary driving means, and control means operably connected to each of said actuators and adapted to alternately render one of said actuators effective to set its respective high torque means and simultaneously render the other two actuators ineffective to assure release of their respective high torque means and assure that only one of said actuators can be effective at any one time, each of said low torque means being effective to maintain tension on its respective drum and cable portion when the cooperating high torque means is ineffective and the high torque means of one of the other drums is effectively connecting the respective drum to the driving means.*

*14. A system for conveying bulk material, comprising three cable winding drums each journaled for independent rotation, a bulk load moving member, cable means connected to said bulk moving member and to each of the respective drums for winding thereon and moving said member in a direction relative to said drums, a rotary driving means for each of said drums, coupling means connecting each of said drums with the driving means including releasable high torque means and low torque means, an independent actuator operably connected to each of the high torque means for setting and releasing the same relative to the rotary driving means, and control means for operating said actuators, comprising a circuit including said actuators, an independent switch in said circuit for each of the actuators, and mechanical means operably connected to all of said switches and adapted to render two of said switches ineffective when the other switch is set to energize its respective actuator, and to assure release of the remaining high torque means when the said one high torque means is set, each of said low torque means being effective to maintain tension on its respective drum and cable portion when the cooperating high torque means is ineffective and the high torque means of one of the other drums is effectively connecting the respective drum to the driving means.*

*15. A cable winding machine, comprising a cable winding drum journaled for rotatable movement, a rotatable driving member, and coupling means consisting of a releasable high torque means adapted to connect the driving member with the drum when the latter is engaged in a cable winding operation, and a predetermined adjustable low torque means continuously connecting said driving member and said drum to maintain a predetermined force on said drum when the high torque means is released.*

*16. A cable winding machine, comprising a cable winding drum journaled for rotatable movement, a rotatable driving member, and coupling means consisting of a releasable high torque means adapted to connect the driving member and the drum when the latter is engaged in a cable winding operation, and a predetermined adjustable constant force low torque means continuously connecting said driving member and the drum to maintain a constant preadjusted low torque on said drum when the high torque means is released.*

*17. A cable winding machine, comprising a cable winding drum journaled for rotatable movement, a rotatable driving shaft, coupling means consisting of a releasable high torque clutch adapted to connect the driving shaft and the drum when the latter is engaged in a cable winding operation, a low torque clutch continuously connecting said driving shaft and said drum, and means operatively connected with said low torque clutch for adjusting the torque thereof to maintain a low torque on said drum when the high torque clutch is released.*

*18. A cable winding machine, comprising a driving shaft journaled for rotatable movement, a cable winding drum circumscribing said shaft between its opposite ends, coupling means including a releasable high torque clutch disposed on one side of said drum and adapted to selectively connect said shaft and drum when the latter is engaged in a cable winding operation, a low torque clutch disposed on the other side of said drum from the high torque clutch and continuously connecting said shaft and said drum for rotating said drum in a direction opposite to the direction of rotation when the high torque clutch is operative, and means operatively connected to said low torque clutch for adjusting the torque thereof to maintain a low torque on said drum when the high torque clutch is released.*

References Cited in the file of this patent or the original patent

UNITED STATES PATENTS

| | | |
|---|---|---|
| 2,349,914 | Peale et al. | May 30, 1944 |
| 2,418,006 | Bangert, Jr. | Mar. 25, 1947 |
| 2,536,483 | Young | Jan. 2, 1951 |
| 2,542,533 | Johansson | Feb. 20, 1951 |
| 2,602,635 | Young | July 8, 1952 |
| 2,635,851 | Maier | Apr. 21, 1953 |